United States Patent
Kim

(10) Patent No.: US 7,634,078 B2
(45) Date of Patent: *Dec. 15, 2009

(54) COMMUNICATION TERMINAL DEVICE ADAPTED TO PHYSICAL CHARACTERISTICS OF TELECOMMUNICATION NETWORK AND METHOD FOR ADAPTING COMMUNICATION TERMINAL DEVICE TO PHYSICAL CHARACTERISTICS OF TELECOMMUNICATION NETWORK

(75) Inventor: Eog-Kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

This patent is subject to a terminal disclaimer.

(21) Appl. No.: 10/965,872

(22) Filed: Oct. 18, 2004

(65) Prior Publication Data
US 2005/0084080 A1    Apr. 21, 2005

(30) Foreign Application Priority Data
Oct. 18, 2003    (KR) ............... 10-2003-0072802

(51) Int. Cl.
*H04M 3/42* (2006.01)
(52) U.S. Cl. ............... 379/387.01; 379/93.09; 379/142.08; 379/386; 379/399.01; 379/413.02
(58) Field of Classification Search ........... 379/387, 379/93.09, 100.12, 387.01, 386, 413.02, 379/142.08, 399.01; 370/277, 352, 535; 709/229; 380/255; 455/424, 556.1, 570
See application file for complete search history.

(56) References Cited

U.S. PATENT DOCUMENTS
5,444,771 A    8/1995    Ohnishi ............... 379/100

(Continued)

FOREIGN PATENT DOCUMENTS
EP    0 748 104    12/1996

(Continued)

OTHER PUBLICATIONS

Korean Patent Office Action dated Aug. 23, 2005 of 10-2003-0072802 and Translation.

*Primary Examiner*—Gerald Gauthier
(74) *Attorney, Agent, or Firm*—Roylance, Abrams, Berdo & Goodman, L.L.P.

(57) ABSTRACT

The communication terminal device includes a handset, a central controller, a telephone network adaptor unit for converting analog signals transmitted/received between telecommunication network and the communication terminal device into digital signals, an interface unit physically isolating the central controller from the telephone network adaptor unit, and transmitting/receiving the converted digital signals between the central controller and the telephone network adaptor unit, and a telephone circuit unit which transmits the voice signals generated by processing the digital signals received from the telephone network adaptor unit to a handset through the interface unit and transmits the digital signals generated by processing the voice signals received from the handset to the telephone network adaptor unit through the interface unit. The telephone network adaptor unit is controlled by the central controller and changes the physical characteristics of the analog signals to be adapted to the physical characteristics of the telecommunication network.

21 Claims, 10 Drawing Sheets

U.S. PATENT DOCUMENTS

| | | | |
|---|---|---|---|
| 5,519,774 A * | 5/1996 | Battista et al. | 379/386 |
| 5,583,922 A * | 12/1996 | Davis et al. | 379/93.09 |
| 6,021,184 A * | 2/2000 | Yoshikawa | 379/93.09 |
| 6,058,104 A * | 5/2000 | Snelling et al. | 370/277 |
| 6,122,353 A * | 9/2000 | Brady et al. | 379/142.08 |
| 6,215,868 B1 * | 4/2001 | Inoue | 379/387.02 |
| 6,269,160 B1 * | 7/2001 | Bartkowiak | 379/386 |
| 6,396,922 B1 | 5/2002 | Khuat | 379/394 |
| 6,487,600 B1 * | 11/2002 | Lynch | 709/229 |
| 6,816,512 B2 * | 11/2004 | Lazarus et al. | 370/535 |
| 6,901,142 B1 * | 5/2005 | Peters et al. | 379/413.02 |
| 6,925,170 B1 * | 8/2005 | Bosma et al. | 379/386 |
| 6,952,600 B2 * | 10/2005 | Paksuniemi et al. | 455/570 |
| 6,973,180 B1 * | 12/2005 | Kunisch et al. | 379/399.01 |
| 7,012,915 B1 * | 3/2006 | Carr | 370/352 |
| 7,398,085 B2 * | 7/2008 | Allegretti | 455/424 |
| 2003/0219128 A1 * | 11/2003 | Luby | 380/255 |
| 2004/0053639 A1 * | 3/2004 | Petite et al. | 455/556.1 |
| 2004/0228472 A1 * | 11/2004 | El-Hennawey et al. | 379/388.06 |

FOREIGN PATENT DOCUMENTS

| | | |
|---|---|---|
| JP | 06-232999 | 8/1994 |
| JP | 08-331271 | 12/1996 |
| KR | 2000-47221 | 7/2000 |
| WO | 99-66704 | 12/1999 |

* cited by examiner

FIG. 4

| SYNC1 | DATA1 | CTRL1 | DATA1bis | SYNC2 | SS | DATA2 | CTRL2 | DATA2bis | SS | Idle | SYNC3 |
|---|---|---|---|---|---|---|---|---|---|---|---|
| 4 | 18 | 18 | 18 | 4 | 2 | 18 | 18 | 18 | 2 | 4 | 2 |
| 8 | 36 | 36 | 36 | 8 | 4 | 36 | 36 | 36 | 4 | 8 | 4 |

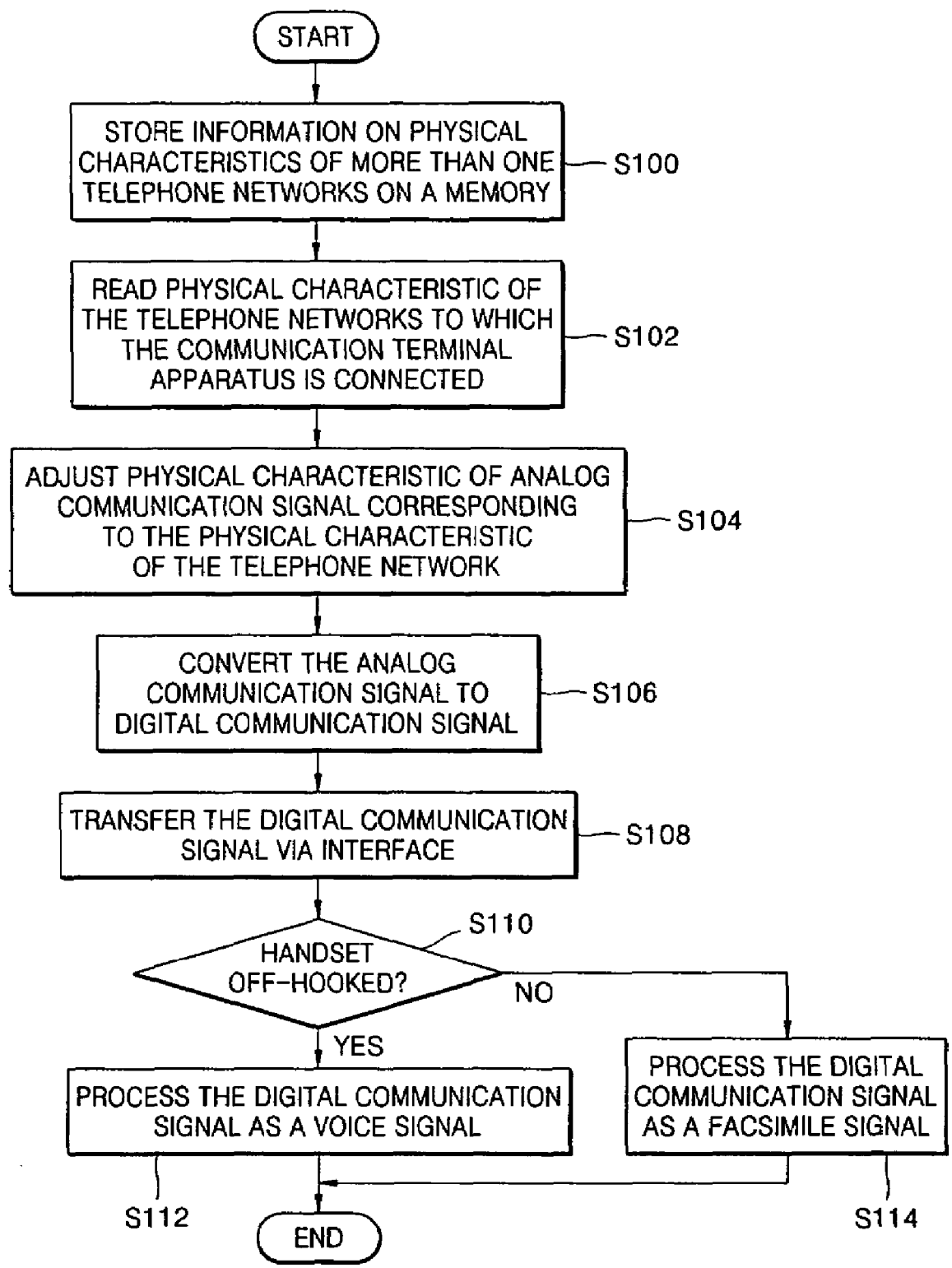

COMMUNICATION TERMINAL DEVICE ADAPTED TO PHYSICAL CHARACTERISTICS OF TELECOMMUNICATION NETWORK AND METHOD FOR ADAPTING COMMUNICATION TERMINAL DEVICE TO PHYSICAL CHARACTERISTICS OF TELECOMMUNICATION NETWORK

CROSS-REFERENCE TO RELATED APPLICATION

This application claims the benefit under 35 U.S.C. §119 (a) of Korean Patent Application No. 2003-72802, filed on Oct. 18, 2003, in the Korean Intellectual Property Office, the disclosure of which is incorporated herein in its entirety by reference.

BACKGROUND OF THE INVENTION

1. Field of the Invention

The present invention relates to a communication terminal device. More particularly, the present invention relates to a communication terminal device adapted to the physical characteristics of a telecommunication network and a method for adapting the communication terminal device to the physical characteristics of the telecommunication network.

2. Description of the Related Art

A communication terminal device, which transmits and receives voice signals or facsimile signals, which is connected to a telecommunication network such as a Public Switched Telephone Network (PSTN) has been widely used. Telecommunication terminal devices embedding various functions are also widely used. Particularly, facsimile devices, which include a facsimile unit to embody facsimile functions and a telephone circuit unit to embody telephone functions, respectively, are widely used.

FIG. 1 is a block diagram for depicting operation of a facsimile device having telephone functions according to the conventional art.

The communication terminal device in FIG. 1 includes a modular jack 10 for connecting to a telecommunication network, a facsimile unit 20, a telephone circuit unit 30, and a switch 15 for connecting to a telephone network, such as a public switched telephone network (PSTN), to the facsimile unit 20 or the telephone circuit unit 30. The PSTN is connected to the communication terminal device through the modular jack 10. When the PSTN is connected to the telephone circuit unit 30 by the switch 15, a loop current of the PSTN flows into the telephone circuit unit 30, and telephone functions are activated. Meanwhile, the facsimile unit 20 is disconnected from PSTN.

A bridge diode (BD) 35 steadily supplies a voltage of a uniform polarity to the telephone circuit unit, regardless of the voltage polarity of the signals from PSTN. The reason that a voltage of uniform polarity has to be supplied steadily to a telephone circuit unit 30 is to keep biasing the transistor elements constituting the telephone circuit unit 30.

Each of the telephone circuit unit 30 and the facsimile unit 20 further includes a DC feeding circuit (not shown) for supplying a DC voltage. The DC feeding circuit maintains the telephone line connection by continuously supplying a DC voltage to keep the connection between the communication terminal device and PSTN from being disconnected. A ring detector 25 delivers ring signals incoming from the PSTN to a Central Processing Unit (CPU) 24, and notifies the CPU 24 of calls from the PSTN. After determining that there is a ring signal, the CPU 24 distinguishes whether the signal delivered from the PSTN is a telephone signal or a facsimile signal, and then conveys it to the respective components.

The telephone circuit unit 34 processes voice signals incoming from the PSTN and delivers them to a handset 36. The telephone circuit 34 also processes the voice signals, which are input from the handset 36, and delivers them to the PSTN. And, the telephone circuit 34 controls the magnitudes of the side-tone signals, which are fed back to the handset 36 among the signals input from the handset 36 and transmitted to the PSTN.

A modem 26 decodes the facsimile signals delivered from the PSTN. An impedance matching unit 28 includes a transformer element and a capacitor to match the impedances of the PSTN and the modem 26. Therefore, when the PSTN is connected to the facsimile unit, it enables the facsimile signals and the like to be transmitted and received between the PSTN and the modem 26. The capacitor included in the impedance matching unit 28 prevents the transformer element from being damaged by an excessive DC current and transmits AC signals only.

As integrated circuit techniques develop, the facsimile unit, the telephone circuit unit, and the like, which are mentioned above, can be integrated in a single element. The telephone circuit unit offered in a single element form includes a microphone terminal for receiving voice signals from the handset and a receiving terminal for receiving voice signals from the PSTN. As noted above, a part of the voice signals, which is received from the microphone terminal and transmitted to the PSTN, is fed back to be delivered again to the handset by the receiving terminal.

The physical characteristics of the PSTN in respective countries all over the world are different. Therefore, each country's PSTN requires a communication terminal device to meet a certain specification, which matches the terminal device to the physical characteristics of the local PSTN. The physical characteristics of public telephone networks of each nation are, for example, the magnitude and frequency characteristics of the voice signals transmitted from the handset to the PSTN, the magnitude and frequency characteristics signals of voice signals, and the magnitude of side-tone signals delivered from PSTN to the handset.

Since these specifications are different in every country, the specifications of the communication terminal devices such as telephone sets must be set differently, corresponding to each and every nation where the devices are exported. That is, in order to export the communication terminal devices according to the conventional art, circuit element values are set differently for each respective country to constitute a separate telephone circuit unit satisfying the requirements related to the telephone characteristics of each country. Although the communication terminal device has the same functions, different telephone circuit units must be provided to let the telephone set operate in each country. Therefore, production costs rise. Furthermore, when a malfunction of the communication terminal device occurs in a certain country, standardized repair service after sales is impossible since a repair is only possible after understanding each nations' specification for the telephone circuit unit.

Therefore, using the unified telephone circuit unit, a communication terminal device adapted to the physical characteristics of the different telecommunication networks in all nations is required.

SUMMARY OF THE INVENTION

To solve the above-described problems, it is an object of the present invention to provide a communication terminal device, which satisfies the physical characteristic requirements for different telephone networks using the same telephone circuit unit.

It is another object of the present invention to provide a method for adapting a communication terminal device to the physical characteristic requirements for different telephone networks using the same telephone circuit unit.

To achieve the objects of the present invention, there is provided a communication terminal device including a handset for inputting and outputting voice signals, the device comprising: a central controller; a telephone network adaptor unit for converting the analog communication signals transmitted and received between telecommunication network and the communication terminal device into digital communication signals; an interface unit for physically isolating the central controller from the telephone network adaptor unit, and transmitting and receiving the converted digital communication signals between the central controller and the telephone network adaptor unit; and a telephone circuit unit, which transmits the voice signals generated by processing the digital communication signals received from the telephone network adaptor unit to a handset through the interface unit, and transmits the digital communication signals generated by processing the voice signals received from the handset to the telephone network adaptor unit through the interface unit, wherein the telephone network adaptor unit is controlled by the central controller and changes the physical characteristics of the analog communication signals so as to be adapted to the physical characteristics of the telecommunication network.

It is preferable that the device further comprises a facsimile unit for processing facsimile signals from the digital communication signals received from the telephone network adaptor unit through the interface unit, wherein the central controller determines whether the handset is off-hooked or not, so the digital communication signals are delivered to the telephone circuit unit when the handset is determined to be off-hooked, and the digital communication signals are delivered to the facsimile unit when the handset is determined not to be off-hooked. It is preferable that the communication terminal device further comprises a memory unit for storing information related to the physical characteristics of one or more telecommunication networks, and wherein the central controller reads the physical characteristics of the telecommunication network to which the communication terminal device connected from the memory unit and controls the telephone network adaptor unit based on the read physical characteristics.

The telephone network adaptor unit preferably comprises a ring detector for detecting ring signals received from the telecommunication network; a DC current adjustor generating a direct current for keeping connection to the telecommunication network when the ring signals are read by the ring detector; an AC signal processor for processing the analog signals transmitted and received between the telecommunication network and the communication terminal device; a signal characteristic adjustor for changing physical characteristics of the analog communication signals controlled by the central controller; and a signal converter for converting the analog communication signals into the digital communication signals.

Embodiments of the present invention further provide a method for adapting a communication terminal device to physical characteristics, the method comprising the steps of: (a) converting the analog communication signals into the digital communication signals to be transmitted and received between the telecommunication network and the communication terminal device; (b) delivering the converted digital communication signals by using an interface unit physically isolating the telecommunication network from the communication terminal device; (c) transmitting to the handset the voice signals generated by processing the digital communication signals received from the interface unit, and transmitting to the interface unit the digital communication signals generated by processing the voice signals received from the handset; and (d) changing the physical characteristics of the analog communication signals to be adapted to the physical characteristics of the telecommunication network. The method further comprises the steps of: (e) determining whether the handset is off-hooked; and (f) processing the digital communication signals as facsimile signals when determined the handset is not off-hooked. It is preferable that the method further comprises the step of (g) storing the information on or related to the physical characteristics of one or more telecommunication network in a memory, wherein the (d) changing step reads from the memory the physical characteristics related to the telecommunication network to which the communication terminal device is connected and changes the physical characteristics of the analog communication signals based on the read physical characteristics. It is preferable that the method the changing step (d) comprises changing the gain of the amplifier to adapt the amplitude of the analog communication signals to the physical characteristics of the telecommunication network. The changing step (d) preferably further comprises changing a pass frequency band through the digital filter to adapt the frequency characteristics of the analog communication signals to the physical characteristics of the telecommunication network.

According to embodiments of the present invention, a communication terminal device can be adapted to the physical characteristics of various telephone networks using same telephone circuit unit.

BRIEF DESCRIPTION OF THE DRAWINGS

The above and other features and advantages of the present invention will become more apparent by describing in detail exemplary embodiments thereof with reference to the attached drawings in which:

FIG. 4 illustrates a signal packet delivered by an interface unit included in the communication terminal device according to another embodiment of the present invention;

FIG. 10 is a flow chart of a method for adapting the communication terminal device to physical characteristics of telephone networks according to another embodiment of the present invention.

DETAILED DESCRIPTION OF THE EXEMPLARY EMBODIMENTS

Figure 1:
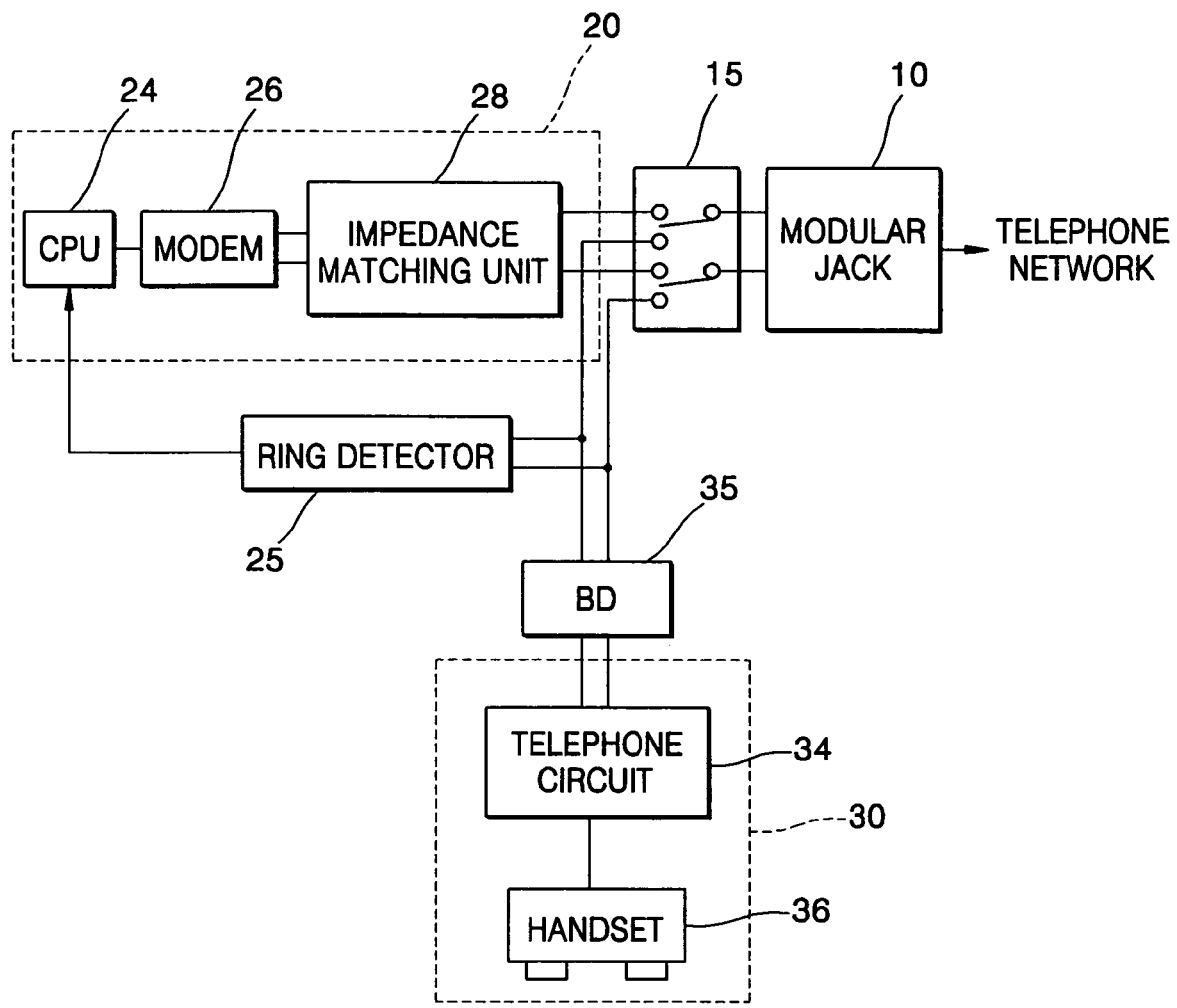
FIG. 1 is a block diagram explaining operation of a communication terminal device according to conventional art.
Figure 2:
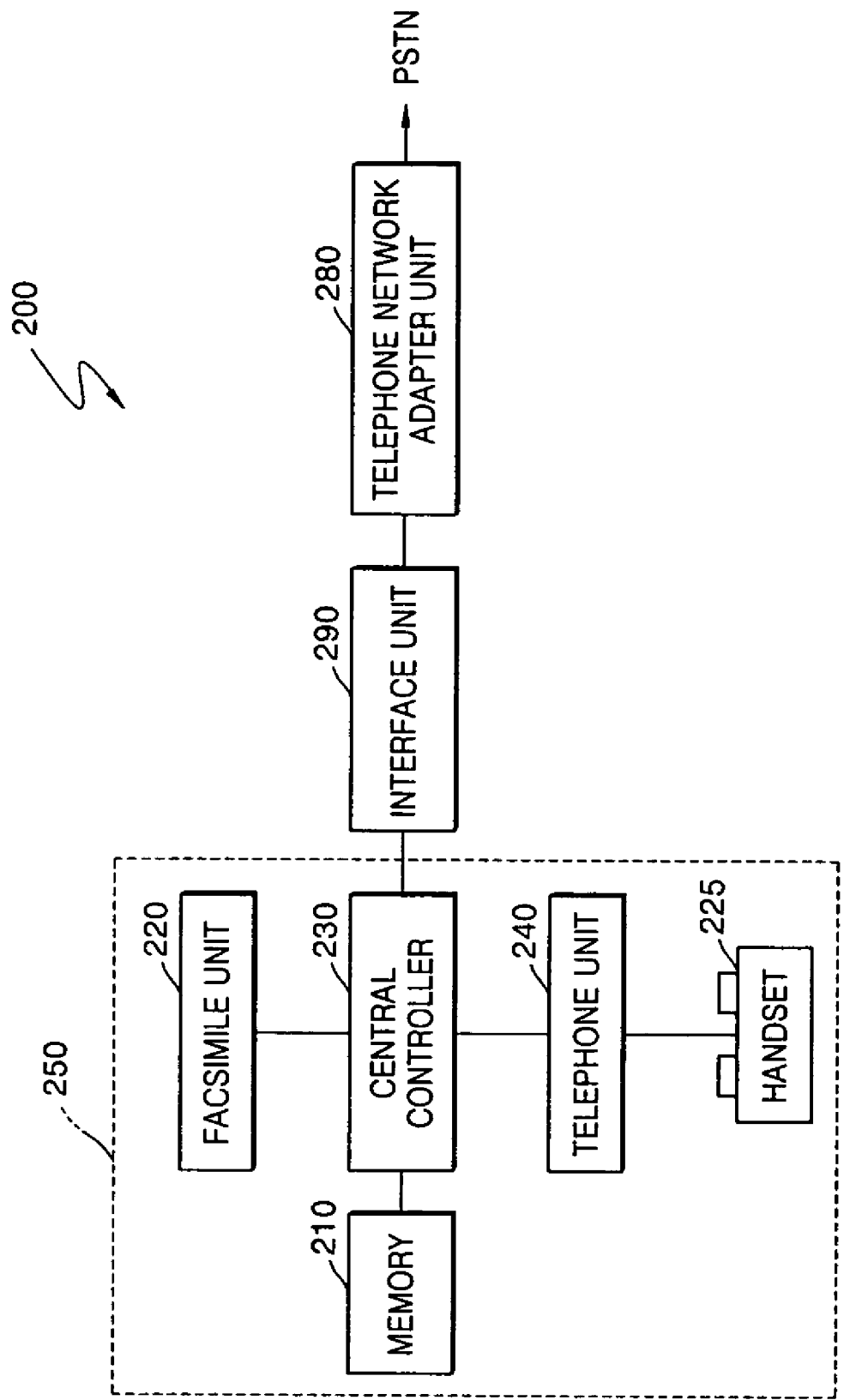
FIG. 2 is a block diagram representing an embodiment of the communicational terminal according to an embodiment of the present invention.

FIG. 2 is a block diagram representing a communicational terminal according to an embodiment of the present invention.

The communication terminal device 200 shown in FIG. 2 comprises a main unit 250, an interface unit 290, and a telephone network adaptor unit 280.

The telephone network adaptor unit 280 manages the physical connection between a communication terminal device 200 and the PSTN. Also, the telephone network adaptor unit 280 reads ring signals from the PSTN, and supplies DC current to maintain the connection between a communication terminal device 200 and the PSTN when the ring signals are detected. In doing so, the telephone network adaptor unit 280 is in charge of transmitting and receiving analog communication signals between the communication terminal device 200 and PSTN. Moreover, the telephone network adaptor unit 280 converts the received analog communication signals into digital communication signals, and transmits the result to the main unit 250 via the interface unit 290. That is, the analog communication signals received from the PSTN are converted into digital communication signals by the telephone network adaptor unit 280, and delivered to the main unit 250 via the interface unit 290. The configuration and operation the telephone adaptor unit 280 will now be described below in detail.

The interface unit 290 transfers the digital communication signals between the telephone network adaptor unit 280 and the main unit 250. According to international safety regulations, the telephone network adaptor unit 280 and the main unit 250 are physically isolated by the interface unit 290. Using elements such as a transformer or a high voltage capacitor, the interface unit 290 delivers digital communication signals between the telephone network adaptor unit 280 and the main unit 250 that are physically isolated. The digital communication signals can include various control signals as well as digitized analog communication signals. The digital communication signals will now be described below in detail.

The main unit 250 comprises a memory 210, a facsimile unit 220, a central controller 230, a telephone circuit unit 240 and a handset 225. The central controller 230 controls the overall operation of the communication terminal device according to an embodiment of the present invention. When it is determined that the analog communication signal received from the PSTN is a facsimile signal, the facsimile unit 220 processes the received facsimile signals. On the other hand, when it is determined that the analog communication signal received from the PSTN is a telephone signal, the received analog signals are processed by the telephone circuit unit and delivered to the handset 225. In order to determine whether the analog signals received from the PSTN are a facsimile signal or a telephone signal, it must be detected whether the handset 225 is off-hooked.

The configuration and operation of the telephone circuit unit 240 will now be described in more detail. The communication terminal device 200 in FIG. 2 is connected to the PSTN through the telephone network adaptor unit 280. Also, the telephone network adaptor unit 280 converts the physical characteristics of the analog communication signals received from the PSTN and adapts the communication terminal device to the physical characteristics of the PSTN. For example, the amplitude of the analog communication signals under the control of the central processor 230 can be altered by changing the gain of an amplifier (not shown) embedded in the telephone network adaptor unit 280. Furthermore, the frequency characteristics of the analog communication signals can be altered by changing the pass band of a digital filter (not shown). Therefore, by only changing the telephone network adaptor unit 280, the communication terminal device having the identical telephone circuit unit 240 can be adapted to the various PSTN. Moreover, the memory unit 210 can store the information regarding the unique physical characteristics of the PSTN of all nations. In this case, the information on the physical characteristics of the PSTN to which the communication terminal device 200 is connected can be read, and the physical characteristics of the analog communication signals can be changed according to the read information. It is preferable that the information on the physical characteristics of the PSTN is provided as firmware. Then, a user can change the physical characteristics of the analog communication signals based on the information offered in the firmware, for example by only choosing the name of the nation, without requiring knowledge of the physical characteristics of the PSTN to which his communication terminal device 200 is connected.

Figure 3:
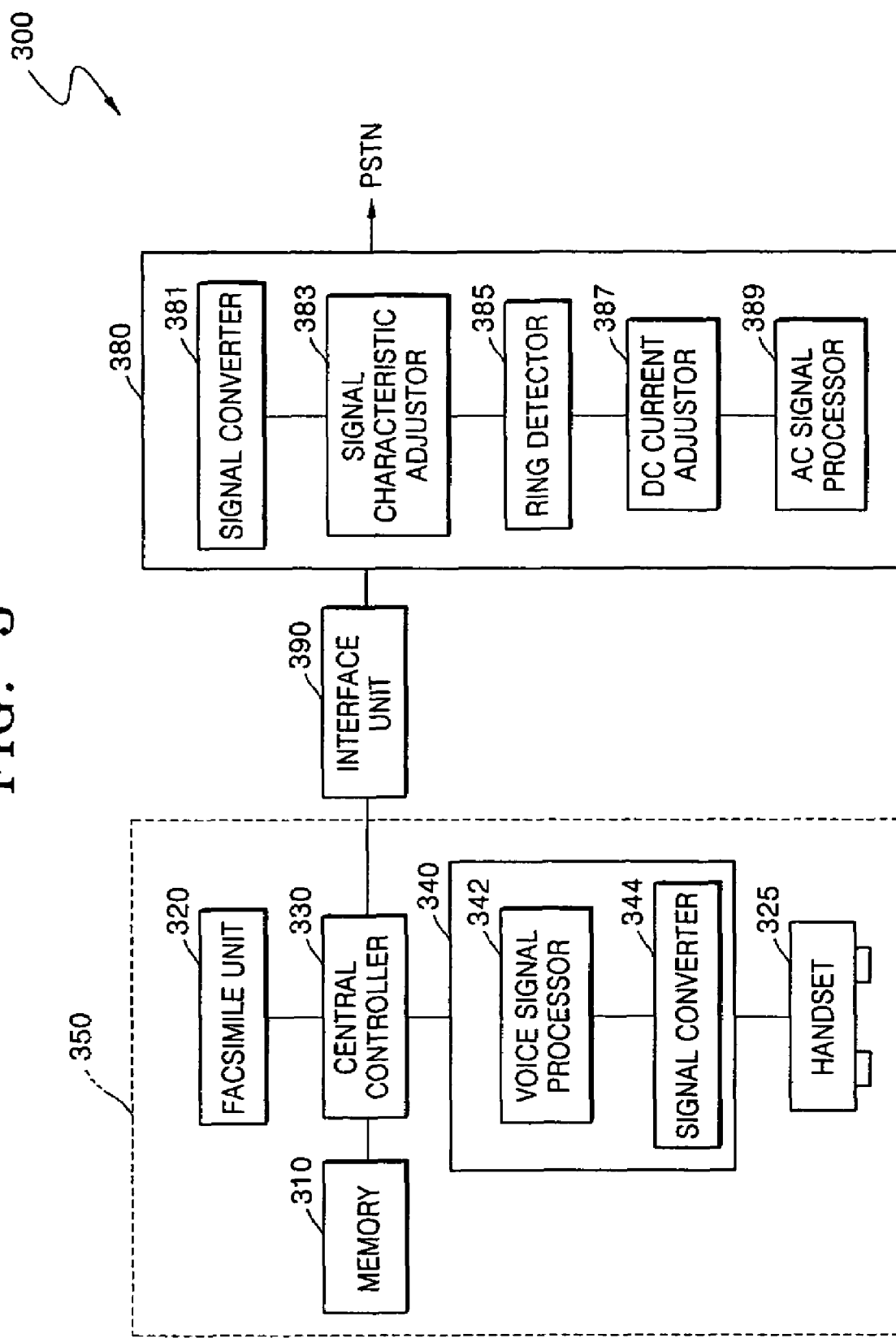
FIG. 3 is a block diagram representing an embodiment of the communicational terminal according to another embodiment of the present invention.

FIG. 3 is a block diagram representing a communicational terminal according to another embodiment of the present invention. The communication terminal device 300 in FIG. 3 comprises a main unit 350, an interface unit 390 and a telephone network adaptor unit 380.

The main unit 350 preferably comprises a memory unit 310, a facsimile unit 320, a central controller 330, a telephone circuit unit 340 and a handset 325. The telephone circuit unit 340 comprises a voice signal processor 342 and a signal converter 344. The telephone network adaptor unit 380 preferably comprises a signal converter 381, a signal characteristic adjustor 383, a ring detector 385, a DC current adjustor 387 and an AC signal processor 389.

The operation of the communication terminal device will now be described as follows referring to FIG. 3. The DC current adjustor 387 included in the telephone network adaptor unit 380 controls the amount of DC current incoming from the PSTN to the telephone network adaptor unit. The signal converter 381 converts the analog communication signals, such as voice or facsimile signals received from the PSTN to the telephone network adaptor unit into digital communication signals. Or, the signal converter 381 converts the digital communication signals received from the interface unit 390 to the telephone network adaptor unit 380 into analog communication signals, and transmits the converted analog signals to the PSTN. As noted above, the components included in the telephone network adaptor unit 380 are controlled by the central controller 330. The control signals generated by the central controller 330 are transmitted and received between the telephone circuit unit 340 and the telephone network adaptor unit 380 via the interface unit 390. The control signals are digital signals delivered in packets and will be described below in detail.

When there is an incoming call from the PSTN to the communication terminal device 300, that is, when a ring signal from the counterpart is received by the communication terminal device 300 according to an embodiment of the present invention, the ring detector 385 detects the received ring signal. The ring detector 385 notifies the central controller 330 via interface unit 390 that the ring signal is detected. Then, the central controller 330 generates the control signals, operates the DC current adjuster 387 in the telephone network adaptor unit 380, and connects the communication terminal device 300 to the PSTN. While communication between the PSTN and the communication terminal device 300 is in progress, the analog communication signals of the counterpart incoming from the PSTN are received by the AC signal processor 389 in the telephone network adaptor unit 380. The physical characteristics of the analog communication signals received by the AC signal processor 389 are changed by the signal characteristic adjustor 383. The signal converter 381 converts the analog communication signals into digital communication signals, and the converted digital communication signals are transmitted to the main unit 350 via the interface unit 390.

The main unit 350 discriminates only voice signals from the received digital communication signals of predetermined form, and restores the analog communication signals using the signal converter 344. The voice signal processor 342 alters the physical characteristics of the voice signals to make them satisfy the requirements of the PSTN, and transmits them to the handset 325.

The transmission of the voice signals from the handset 325 to the PSTN will now be described in more detail. The voice signals received by the handset 325 are processed by the voice signal processor 342. The voice signal processor alters the physical characteristics of the received voice signals. The processed voice signals are converted into digital communication signals by the signal converter 344. Then, the converted digital communication signals are transmitted to the telephone network adaptor unit 380 via the interface unit 390. The digital communication signals transmitted to the telephone network adaptor unit 380 are converted into analog signals by the signal converter 381. And, the digital communication signals whose physical characteristics are altered by the signal characteristic adjustor 383 are transmitted to the PSTN by the AC signal processor 389.

The physical characteristics of the analog communication signals transmitted and received between the PSTN and the telephone network adaptor unit 380 are adjusted by the signal characteristic adjustor 383. As noted above, the amplitudes and frequency characteristics of the analog communication signals can be included in the physical characteristics of the analog communication signals. Each of the amplitude and frequency characteristics are easily altered by changing the gain of an amplifier (not shown) and the frequency pass band of a digital filter embedded in the signal characteristic adjustor 383.

The physical characteristics of the analog communication signals transmitted and received between the telephone circuit unit 340 and the handset 325 can preferably be changed by the voice signal processor 342 in the telephone circuit unit 340.

In the communication terminal device 300 in FIG. 3, the determination on the target unit out of the telephone circuit unit 340 and the facsimile unit 320, to which the digital communication signals received from the telephone network adaptor unit 380 are to be transmitted is as follows. That is, the central controller 330 can determine whether the handset 325 is off-hooked, and then determine whether the digital communication signals are either voice signals or facsimile signals.

When the handset 325 is determined to be off-hooked, it can be expected that the user is going to make a voice call, so the digital communication signals are delivered to the telephone circuit unit 340. On the other hand, the handset 325 is determined not to be off-hooked, it can be expected that a telephone line has been established between the telephone network and the communication terminal device 300 possibly by a device with an automatic facsimile mode function. In which case, the digital communication signals are delivered to the facsimile unit 320.

The memory unit 310 stores the information regarding the physical characteristics demanded in the PSTN by nations for meeting the requirements of the different telephone characteristics of the specific nations. This information can be offered in firmware or software. Then, without necessarily knowing the physical characteristics of the PSTN, a user can adapt the communication terminal device 300 to the specific PSTN.

FIG. 4 is illustrating a signal packet delivered by an interface unit included in the communication terminal device according to an embodiment of the present invention.

The signal packet shown in FIG. 4 comprises first through third synchronization patterns SYNC1, SYNC2, SYNC3, first and second data patterns DATA1, DATA2, first and second control patterns CTRL1, CTRL2, first and second duplicate date patterns DATA1bis, DATA2bis, a steady state pattern (SS), and an idle pattern (Idle). The mid-figure in FIG. 4 represents the number of symbols constituting each pattern, and the bottom-most figure represents the number of data bits constituting each pattern.

The number of data bits constituting each pattern correspond to two times the number of symbols. The reason is that 2-bit binary data is encoded to represent one symbol for facilitating the prevention of data noise and the maintenance of synchronization. That is, one of the digital communication signal packets transmitted and received by the interface unit 390 in FIG. 3 is constituted with 126 symbols in total, and since one symbol is represented by two data bits, the total bit number of one packet is 252.

Data bits for representing logic '0', logic '1', logic 'A' and logic 'B' are as shown in the table 1.

TABLE 1

| Symbol | Data bit representation | |
|---|---|---|
| | Data Bit | Description |
| 0 | 01 | logic '0' |
| 1 | 10 | logic '1' |
| A | 11 | used only for sync. |
| B | 00 | used only for sync. |

Figure 5:
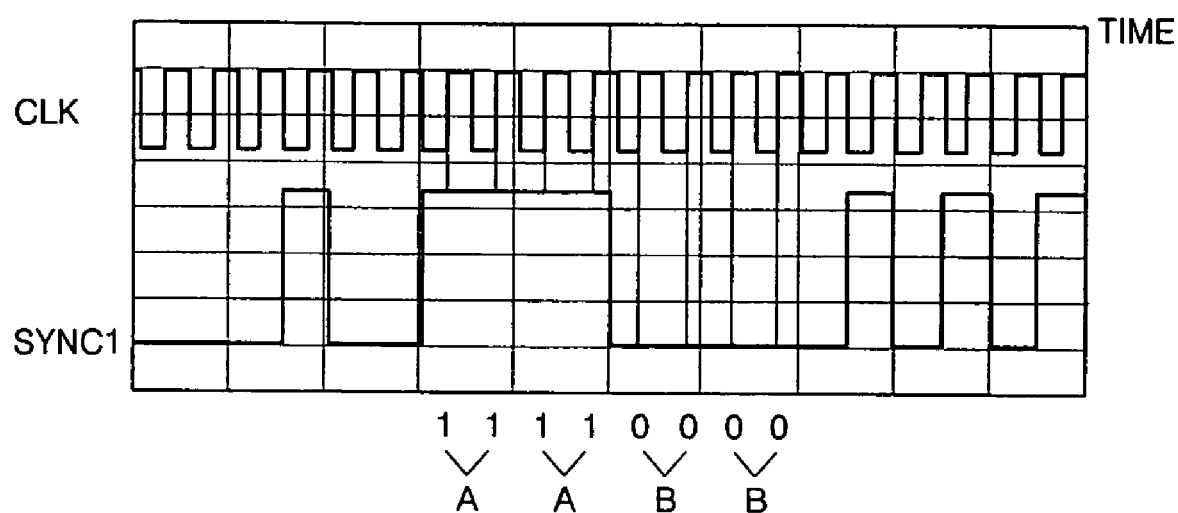
FIG. 5 is a waveform diagram illustrating an exemplary first synchronization pattern of the signal packets shown in FIG. 4.

The patterns constituting signal packets shown in FIG. 4 will be described later. FIG. 5 is a waveform diagram illustrating an exemplary first synchronization pattern of the signal packets shown in FIG. 4.

The first synchronization pattern SYNC 1 notifies a start point of the digital communication signals. In the waveform diagram shown in FIG. 5, the first synchronization pattern SYNC1 preferably consists of symbol "AABB". Referring to table 1 above, the symbol "AABB" corresponds to data bit "11110000". As shown in FIG. 5, when the logic value of the first synchronization pattern SYNC1 is detected at rising edges of each clock, bit values of "1111000" are gained. And, since the bit value "11110000" corresponds to the symbol "AABB", the first synchronization pattern SYNC1 is identified, and the start of the digital communication can be recognized. The reason for representing the first synchronization SYNC1 by using the symbol "AABB" is that logic 0 and logic 1 cannot occur in series during data or control patterns. If logic 1 or logic 0 occurred in series during the data or control patterns, it is determined that an error has occurred.

When the first synchronization is identified, the first data pattern DATA1, the first control pattern CTRL1 and the first duplicate data pattern are transmitted sequentially, which corresponds to eighteen symbols, respectively.

The first data pattern DATA1, which is transmitted from a main unit to a telephone network adaptor unit 380 preferably comprises eighteen symbols. The data transmitted to the PSTN via the telephone network adaptor unit 380 from the main unit 350 are transmitted in the form of digital communication signals. The transmitted digital communication signals are restored to analog communication signals through the signal converter in the telephone network adaptor unit 380, and transmitted to the PSTN. The first data pattern DATA1 preferably can include a net data comprising sixteen symbols and an error correction code comprising two symbols.

The first control pattern CTRL1 is transmitted from the main unit 350 to the telephone network adaptor unit 380, and includes eighteen symbols in total. In the telephone network adaptor unit 380, preferably 8-bit registers for a total of 38 can be included. The address of the register whose values are read or changed can be allocated by using the first control pattern CTRL1. For example, the first control pattern CTRL1 can include one symbol of a read/write flag, seven symbols of an address pattern, eight symbols of a data pattern and two symbols of an error correction code. The seven symbols of the address pattern allocate an 8-bit register address, and eight symbols of data pattern represent the values of respective registers.

The first duplicate data pattern DATA1bis has the value identical to that of the first data pattern DATA1. The reason for further including the first duplicate data pattern DATA1bis besides the first date pattern DATA1 is to enhance the error detection efficiency. Therefore, for simplicity of configuration, the first duplicate data pattern DATA1bis can be omitted. When the first duplicate data pattern DATA1bis and the first data pattern DATA1 are not in accord with each other by comparison, it is considered that an error has occurred during transmission. If the main unit 350 does not transmit the first duplicate data pattern DATA1bis, the telephone network adaptor unit 380 will not transmit the second duplicate data pattern DATA2bis correspondingly.

Figure 6:
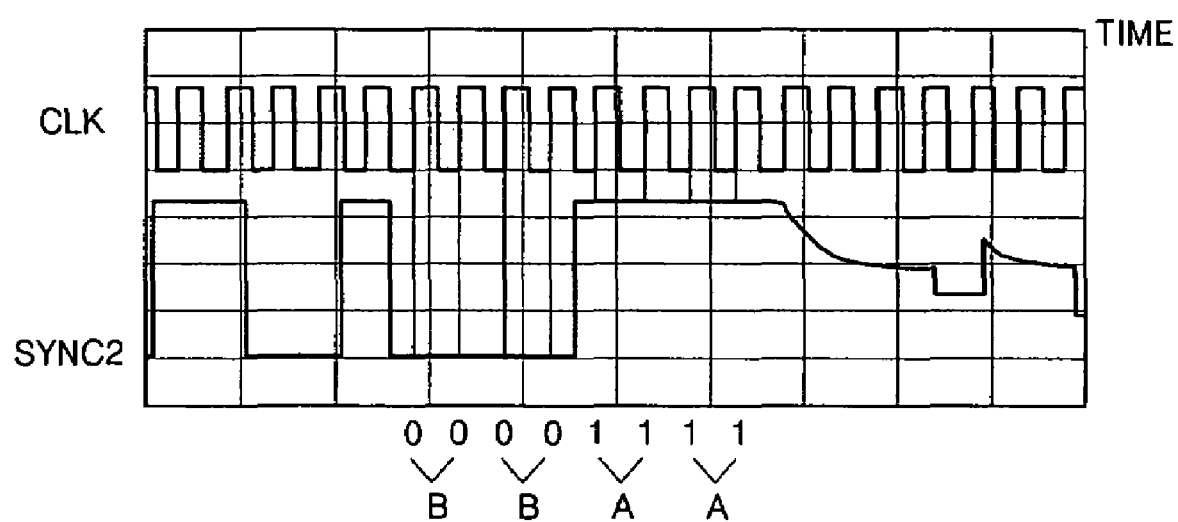
FIG. 6 is a waveform diagram illustrating an exemplary second synchronization pattern of the signal packets shown in FIG. 4.

FIG. 6 is a waveform diagram illustrating a second exemplary synchronization pattern among the signal packets shown in FIG. 4. Contrary to the first synchronization pattern SYNC1, the second synchronization pattern SYNC2 is represented as symbol "BBAA". Therefore, referring to the waveform diagram shown in FIG. 6, the second synchronization pattern SYNC2 is identified since the logic values of the second synchronization pattern SYNC2 detected at rising edges of clocks correspond to "00001111". The second synchronization pattern SYNC2 is located at the tail of the data packet transmitted from the main unit 350 to the telephone network adaptor unit 380. When the second synchronization pattern SYNC2 is detected, the telephone network adaptor unit 380 alters the channel from the reception mode to the transmission mode.

Figure 7:
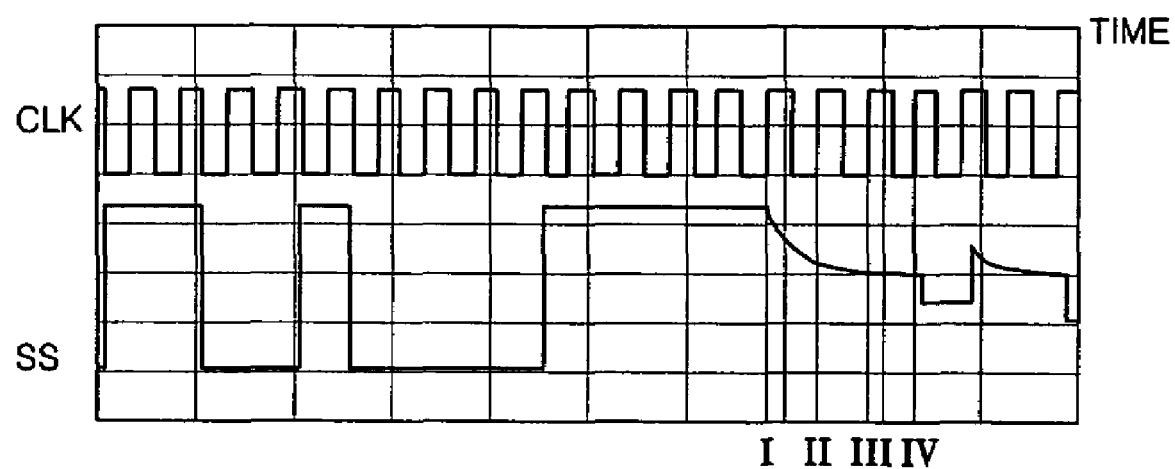
FIG. 7 is a waveform diagram illustrating an exemplary steady-state pattern of the signal packets shown in FIG. 4.

FIG. 7 is a waveform diagram illustrating a steady-state pattern of the signal packets shown in FIG. 4. The steady-state packet represents the time interval from the instance when the second synchronization pattern SYNC2 is identified until the instance when the direction of data transmission is changed. During this period, a driver channel between the main unit 350 and the telephone network adaptor unit 380 is altered. That is, during the steady-state period after the second synchronization pattern SYNC2 is transmitted, the channel of the main unit 350 is altered to reception mode, and in the meantime, the channel of the telephone network adaptor unit 380 is altered from reception mode to transmission mode. Two symbol periods (I, II, III, IV) elapse during one steady state pattern.

After the steady-state packet is transmitted, the second data pattern DATA2 is transmitted from the telephone adaptor unit 380 to the main unit 350. Just as in the first data pattern DATA1, the second data pattern DATA2 comprises eighteen symbols in total. But, according to the setting of a loop monitoring register included in the telephone network adaptor unit, the data can be changed. The data is transmitted from the telephone network adaptor unit 380 to the main unit 350. If loop monitoring register is set to 0, the analog communication signals (such as modem data, caller indicating information, etc.) received from the PSTN is transmitted to main unit 350 since it is determined that the telephone network adaptor unit 380 is forming an actual loop. If loop monitoring register is set to 1, the input ring signals are delivered to the main unit 350, since it is determined that the telephone network adaptor unit 380 is in idle state. The loop monitoring register can be set by the first control pattern CTRL1 transmitted from the main unit 350.

The second control pattern CTRL2 is data transmitted from the telephone network adaptor unit 380 to the main unit 350, and comprises eighteen symbols just as the first control pattern CTRL1. The second control pattern CTRL2 delivers the value of the register included in the telephone adaptor unit to the main unit. If the first control pattern CTRL1 of the main unit is set to 'read' and sent to the telephone network adaptor unit 380, the telephone network adaptor unit 380 can load the 8-bit data read from the requested register and send the data to the main unit 350. Or, if the first control pattern CTR1 of the main unit 350 is set to 'write' and sent to the telephone network adaptor unit 380, the telephone network adaptor unit 380 can write the data on the requested register and load the written value on the second control patter CTRL2 to send it to the main unit 350.

The second duplicate data pattern DATA2bis has the same value as the second data pattern DATA2. If the main unit 350 does not transmit the first duplicate patter DATA1bis, the telephone network adaptor unit 380 will recognize so and will not transmit the second duplicate pattern DATA2bis, as noted above.

Figure 8:
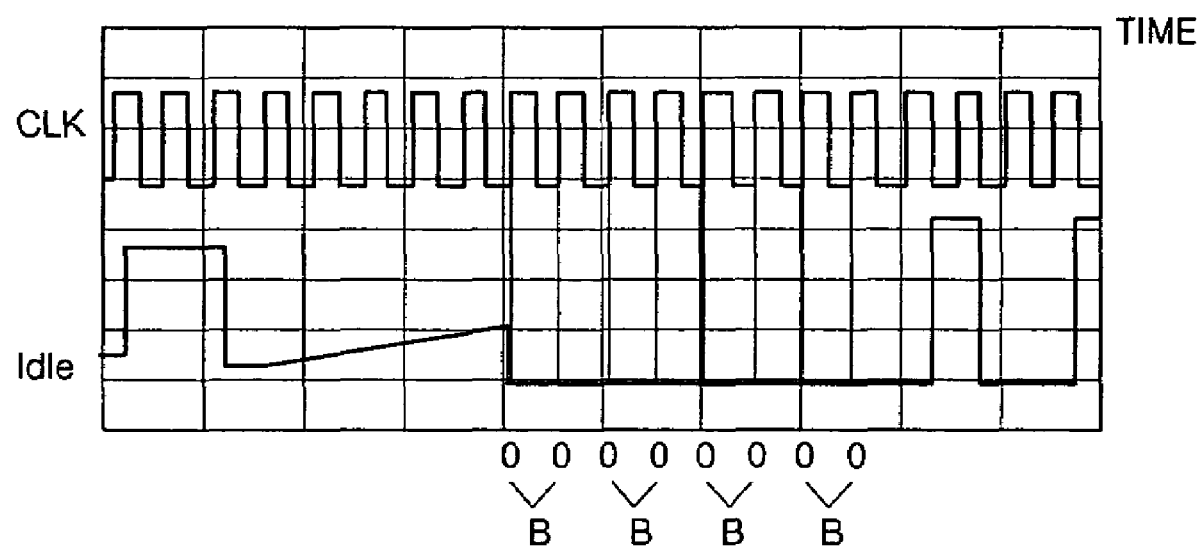
FIG. 8 is a waveform diagram illustrating an exemplary idle pattern of the signal packets shown in FIG. 4.

FIG. 8 is a waveform diagram illustrating an exemplary idle pattern of the signal packet shown in FIG. 4. The idle pattern (Idle) is a time interval from when data is sent from the telephone network adapter unit 380 to the main unit 350 to complete one frame to when next frame is transmitted. In the drawing shown in FIG. 8, the idle pattern Idle preferably comprises four symbols of "BBBB" which correspond to a bit data "00000000".

Figure 9:
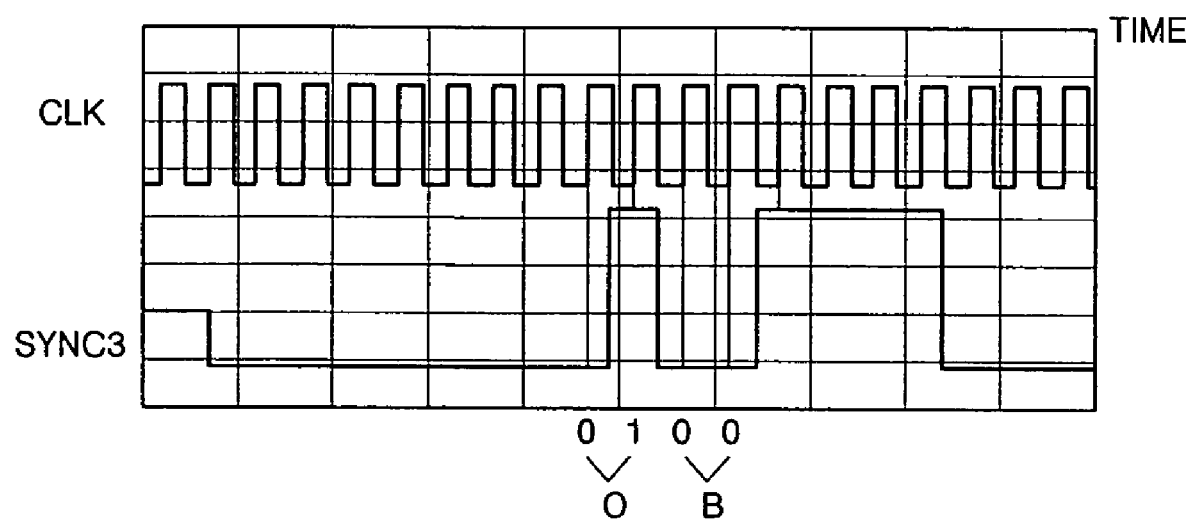
FIG. 9 is a waveform diagram illustrating an exemplary third synchronization pattern of the signal packets shown in FIG. 4.

FIG. 9 is a waveform diagram illustrating an exemplary synchronization pattern of the signal packets shown in FIG. 4. In the waveform diagram shown in FIG. 9, the third synchronization pattern SYNC3 is marked with two symbols of "OB". When the third synchronization pattern SYNC3 is identified, the data packet is recognized to be completed, and a new data packet is transmitted.

FIG. 4 through FIG. 9 is to be comprehended only as examples. That is, any communication terminal device which includes a separate telephone network adapter unit for connecting to the PSTN, and uses various signal waveforms allowing the device to transmit and receive digital communication signals between the main unit and the telephone network adapter unit is to be understood to be within the technical scope of the present invention.

FIG. 10 is a flow chart of a method for adapting the communication terminal device to physical characteristics of various telephone networks according to another embodiment of the present invention.

At first, information on or related to the physical characteristics of one or more telecommunication networks is stored in a memory S100. The reason for storing the physical characteristics of a plurality of telecommunication networks is to adapt the communication terminal device by preferably only using a simple name of the nation, even when the user does not know the physical characteristics of telecommunication network to which his communication terminal device is connected.

The communication terminal device according to an embodiment of the present invention reads the physical characteristics of the telephone network supplied in firmware, when it is used in an individual nation S102. Therefore, the physical characteristics of the analog communication signals are changed so as to be adapted to the physical characteristics of the telecommunication network S104. As noted above, the communication terminal device to which the method according to an embodiment of the present invention is applied comprises the telephone network adaptor unit separately from the telephone circuit unit which are in charge of physical connection with the PSTN, so the physical characteristics of the telephone network adaptor unit are changed corresponding to the physical characteristics of the PSTN to which the communication terminal device is connected.

Then, the analog communication signals received from the PSTN are received by the telephone network adaptor unit, and are converted into digital communication signals S106. The converted digital communication signals are delivered to the main unit of the communication terminal device via the interface unit S108.

Whether the delivered digital communication signals are to be determined as facsimile signals or telephone signals is decided by whether the handset is off-hooked S110. That is, when it is determined the handset is off-hooked, it is determined that a user is to use telephone functions of the communication terminal device. Therefore, the digital communication signals are processed as voice signals S112. On the other hand, when the handset is not off-hooked, since the digital communication signals are determined to be facsimile signals, they are processed as facsimile signals S114.

The flow chart shown in FIG. 10 only depicts processes of receiving and processing analog communication signals from the PSTN. However, according to embodiments of the present invention, it is certain that incoming voice signals from the handset can be delivered after adapting the communication terminal device to the physical characteristics of the PSTN.

According to embodiments of the present invention, a communication terminal device which satisfies the physical characteristic requirements of different telephone networks using the same telephone circuit unit is provided.

In addition, a method for adapting a communication terminal device to the physical characteristic requirements of different telephone networks using the same telephone circuit unit is provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A communication terminal device including a handset for inputting and outputting voice signals and processing signals according to a physical characteristics specification of a designated telecommunication network corresponding to one or more countries, the device comprising:
   a controller;
   a telephone network adaptor unit for converting analog communication signals transmitted and received between a telecommunication network and the communication terminal device into digital communication signals;
   an interface unit for physically isolating the controller from the telephone network adaptor unit, and transmitting and receiving the converted digital communication signals between the controller and the telephone network adaptor unit;
   a telephone circuit unit, which transmits the voice signals generated by processing the digital communication signals received from the telephone network adaptor unit to a handset through the interface unit, and, which transmits the digital communication signals generated by processing the voice signals received from the handset to the telephone network adaptor unit through the interface unit;
   a facsimile unit for processing facsimile signals from the digital communication signals received from the telephone network adaptor unit through the interface unit; and
   a memory unit for storing information related to the physical characteristics specification of one or more telecommunication networks,
   wherein the controller determines whether the handset is off-hooked or not, so that the digital communication signals are delivered to the telephone circuit unit when the handset is determined to be off-hooked, and the digital communication signals are delivered to the facsimile unit when the handset is determined not to be off-hooked,
   wherein the controller reads the physical characteristics specification of the designated telecommunication network and controls the telephone network adaptor unit according to the read physical characteristics specification to change at least one physical characteristic of the analog communication signals so as to be adapted to the physical characteristics specification of the designated telecommunication network, and further controls the telephone circuit unit according to the read physical characteristics specification to change at least one physical characteristic of voice signals so as to be adapted to the physical characteristics specification of the designated telecommunication network.

2. The communication terminal device of claim 1, wherein the telephone network adaptor unit further comprises:
   a ring detector for detecting ring signals received from the telecommunication network;

a DC current adjustor generating a direct current for maintaining a connection to the telecommunication network when the ring signals are detected by the ring detector;

an AC signal processor for processing analog signals transmitted and received between the telecommunication network and the communication terminal device;

a signal characteristic adjustor, controlled by the controller, for changing physical characteristics of analog communication signals so as to be adapted to the physical characteristics specification of the designated telecommunication network; and a signal converted for converting analog communication signals into digital communication signals.

3. The communication terminal device of claim 2, wherein the signal characteristic adjustor comprises an amplifier for amplifying analog communication signals, wherein the amplifier is controlled by the controller to change the gain of the amplifier.

4. The communication terminal device of claim 1, the telephone circuit unit further comprises:

a signal converting unit for converting digital communication signals received from the interface unit into analog communication signals; and a voice signal processor for processing analog communication signals transmitted and received between the handset and the signal converter, wherein the voice signal processor, controlled by the controller, changes at least one physical characteristic of the analog communication signals so as to be adapted to the physical characteristics specification of the designated telecommunication network.

5. The communication terminal device of the claim 4, wherein the telephone circuit unit further comprises:

an amplifier for amplifying the analog communication signals; and a digital filter for passing only a predetermined frequency band from the analog communication signals, wherein the amplifier is controlled by the controller to change the gain of the amplifier, wherein the digital filter is controlled by the controller to change the frequency band.

6. The communication terminal device of the claim 1, wherein the interface unit uses a transformer to transmit and receive the digital communication signals between the controller and the telephone network adaptor unit.

7. The communication terminal device of the claim 1, wherein the interface unit uses a high voltage capacitor to transmit and receive the digital communication signals between the central controller and the telecommunication network adaptor unit.

8. The communication terminal device of claim 1, wherein the at least one physical characteristic of voice signals changed by the telephone circuit unit corresponds to at least one of magnitude characteristics of voices signals and frequency characteristics of voice signals transmitted from the handset to the telecommunication network.

9. The communication terminal device of claim 1, wherein the at least one physical characteristic of voice signals changed by the telephone circuit unit corresponds to at least one of magnitude characteristics of voices signals, frequency characteristics of voice signals and magnitude of side-tone signals transmitted from the telecommunication network to the handset.

10. A method for processing signals, by a communication terminal device including a handset for inputting and outputting voice signals, according to a physical characteristics specification of a designated telecommunication network corresponding to one or more countries and, the method comprising:

(a) converting, via a telephone network adaptor unit, analog communication signals into digital communication signals to be transmitted and received between a telecommunication network and the communication terminal device;

(b) physically isolating the telecommunication network from a telephone circuit unit using an interface unit;

(c) transmitting, via the telephone circuit unit, to the handset, voice signals generated by processing the digital communication signals received from the interface unit, and transmitting to the interface unit the digital communication signals generated by processing voice signals received from the handset;

(d) changing, via the telephone network adaptor unit, at least one physical characteristic of the analog communication signals so as to be adapted to the physical characteristics specification of the designated telecommunication network;

(d1) changing, via the telephone circuit unit, at least one physical characteristic of voice signals so as to be adapted to the physical characteristics specification of the designated telecommunication network, (e) determining whether the handset is off-hooked;

(f) processing the digital communication signals as facsimile signals when determined the handset is not off-hooked; and (g) storing information relating to the physical characteristics specification of two or more telecommunication networks in a memory, wherein changing step (d) reads from the memory the information relating to the physical characteristics specification of the designated telecommunication network and changes at least one physical characteristic of the analog communication signals according to the read physical characteristics information, wherein changing step (d1) reads from the memory the information relating to the physical characteristics specification of the designated telecommunication network and changes at least one physical characteristic of the voice signals according to the read physical characteristics information.

11. The method of the claim 10, wherein changing step (d) changes the gain of the amplifier to change the amplitude of the analog communication signals so as to be adapted to the physical characteristics specification of the designated telecommunication network.

12. The method of the claim 10, wherein changing step (d) changes a pass frequency band through the digital filter to change a frequency characteristic of the analog communication signals so as to be adapted to the physical characteristics specification of the designated telecommunication network.

13. The method of claim 10, wherein the at least one physical characteristic of voice signals changed by the telephone circuit unit corresponds to at least one of magnitude characteristics of voice signals and frequency characteristics of voice signals transmitted from the handset to the telecommunication network.

14. The method of claim 10, wherein the at least one physical characteristic of voice signals changed by the telephone circuit unit corresponds to at least one of magnitude characteristics of voice signals, frequency characteristics of voice signals and magnitude of side-tone signals transmitted from the telecommunication network to the handset.

15. A communication terminal device including a handset for inputting and outputting voice signals and processing signals according to a physical characteristics specification of a designated telecommunication network corresponding to one or more countries, the device comprising:

a controller;

a telephone network adaptor unit for converting analog communication signals transmitted and received between a telecommunication network and the communication terminal device into digital communication signals;

an interface unit for physically isolating the controller from the telephone network adaptor unit, and transmitting and receiving the converted digital communication signals between the controller and the telephone network adaptor unit;

a telephone circuit unit, which transmits the voice signals generated by processing the digital communication signals received from the telephone network adaptor unit to a handset through the interface unit, and, which transmits the digital communication signals generated by processing the voice signals received from the handset to the telephone network adaptor unit through the interface unit;

an image scanner for generating facsimile signals, wherein the transmitter is configured for transmitting facsimile signals received from said image scanner; and a memory unit for storing information related to the physical characteristics specification of one or more telecommunication networks, wherein the controller reads the physical characteristics specification of the designated telecommunication network and controls the telephone network adaptor unit according to the read physical characteristics specification to change at least one physical characteristic of the analog communication signals so as to be adapted to the physical characteristics specification of the designated telecommunication network, and further controls the telephone circuit unit according to the read physical characteristics specification to change at least one physical characteristics of voice signals so as to be adapted to the physical characteristics specification of the designated telecommunication network.

16. The communication terminal device of claim 15, wherein the at least one physical characteristic of voice signals changed by the telephone circuit unit corresponds to at least one of magnitude characteristics of voice signals and frequency characteristics of voice signals transmitted from the handset to the telecommunication network.

17. The communication terminal device of claim 15, wherein the at least one physical characteristic of voice signals changed by the telephone circuit unit corresponds to at least one of magnitude characteristics of voice signals, frequency characteristics of voice signals and magnitude of side-tone signals transmitted from the telecommunication network to the handset.

18. A method for a communication terminal device including a handset for inputting and outputting voice signals and processing signals according to configuration data of a selected Public Switched Telephone Network ("PSTN"), the method comprising:
(a) converting, via a telephone network adaptor unit, analog communication signals into digital communication signals to be transmitted and received between a telecommunication network and the communication terminal device;
(b) using an interface to physically isolate the telecommunication network from a telephone circuit unit;
(c) transmitting, via the telephone circuit unit, to a handset the voice signals generated by processing the digital communication signals received from an interface unit, and transmitting to the interface unit the digital communication signals generated by processing the voice signals received from the handset;
(d) storing configuration data for a plurality of PSTNs in a memory;
(e) selecting configuration data, in response to a user operation, for at least one PSTN from the memory;
(f) changing, via the telephone network adaptor unit, at least one physical characteristic of the analog communication signals according to the selected configuration data so as to be adapted for the selected PSTN; and
(g) changing, via the telephone circuit unit, at least one physical characteristic of voice signals according to the selected configuration data so as to be adapted to the selected PSTN.

19. The method of claim 18, wherein the at least one physical characteristic of voice signals changed by the telephone circuit unit corresponds to at least one of magnitude characteristics of voice signals and frequency characteristics of voice signals transmitted from the handset to the telecommunication network.

20. The method of claim 18, wherein the at least one physical characteristic of voice signals changed by the telephone circuit unit corresponds to at least one of magnitude characteristics of voice signals, frequency characteristics of voice signals and magnitude of side-tone signals transmitted from the telecommunication network to the handset.

21. A communication terminal device including a handset for inputting and outputting voice signals and processing signals according to configuration data of a selected Public Switched Telephone Network ("PSTN"), the device comprising:

a controller;

a telephone network adaptor unit for converting analog communication signals transmitted and received between a telecommunication network and the communication terminal device into digital communication signals;

an interface unit for physically isolating the controller from the telephone network adaptor unit, and transmitting and receiving the converted digital communication signals between the controller and the telephone network adaptor unit; a telephone circuit unit, which transmits the voice signals generated by processing the digital communication signals received from the telephone network adaptor unit to a handset through the interface unit, and, which transmits the digital communication signals generated by processing the voice signals received from the handset to the telephone network adaptor unit through the interface unit;

a memory unit for storing configuration data for a plurality of PSTNs; and a user interface for selecting configuration data, in response to a user operation, for at least one PSTN from the memory, wherein the controller reads the selected configuration data of the selected PSTN and controls the telephone network adaptor unit according to the read configuration data to change at least one physical characteristic of the analog communication signals so as to be adapted to the selected PSTN, and further controls the telephone circuit unit according to the read configuration data to change at least one physical characteristics of voice signals so as to be adapted to the selected PSTN.

* * * * *

UNITED STATES PATENT AND TRADEMARK OFFICE
CERTIFICATE OF CORRECTION

PATENT NO. : 7,634,078 B2  Page 1 of 1
APPLICATION NO. : 10/965872
DATED : December 15, 2009
INVENTOR(S) : Eog-Kyu Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1430 days.

Signed and Sealed this

Ninth Day of November, 2010

David J. Kappos
*Director of the United States Patent and Trademark Office*